May 26, 1964  K. B. BREDTSCHNEIDER  3,134,396
BALL VALVE WITH ADJUSTABLE SEATS
Filed May 1, 1961
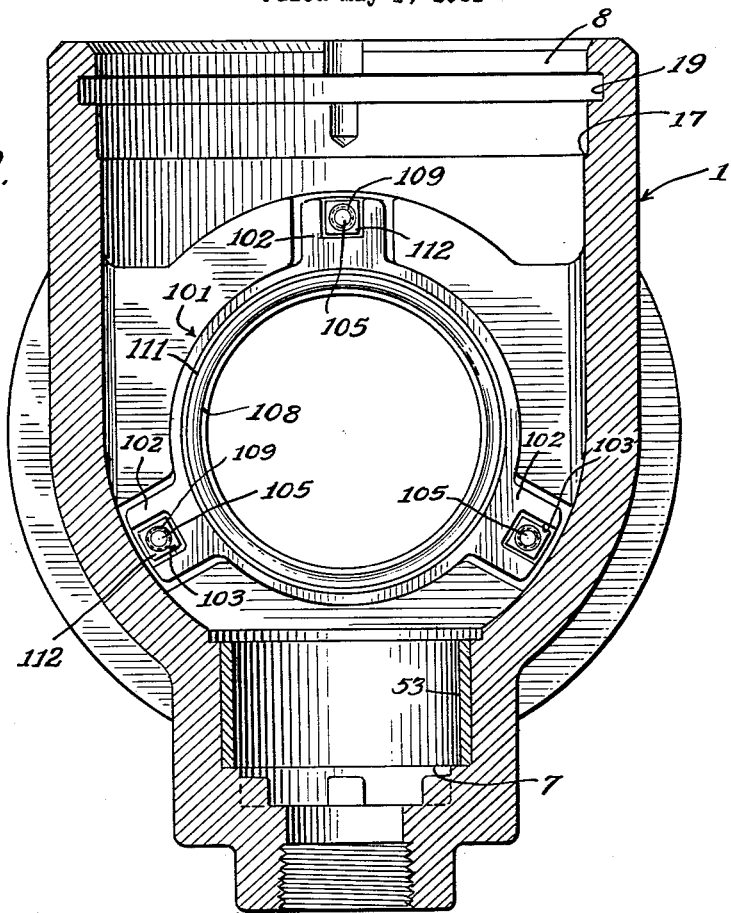
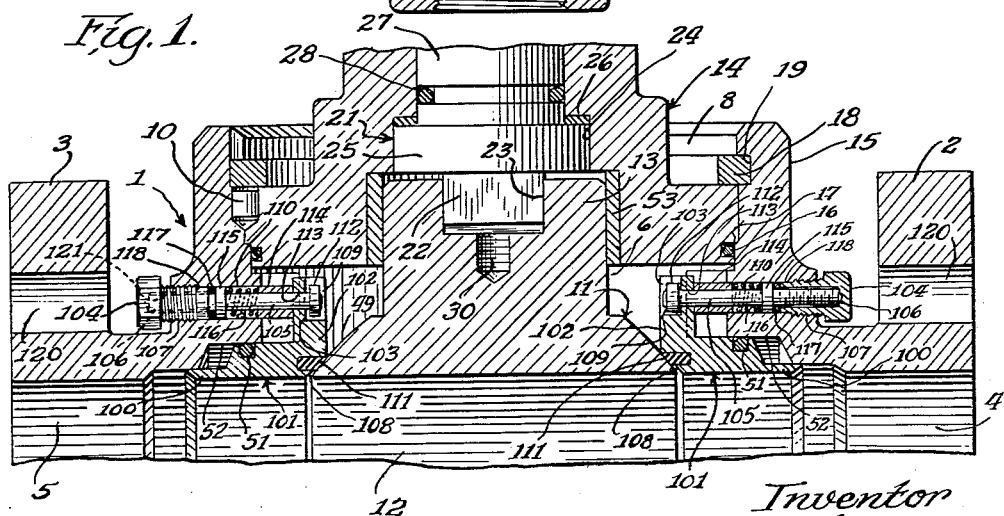
Inventor
Kurt B. Bredtschneider
By Joseph O. Lange
Atty.

United States Patent Office 3,134,396
Patented May 26, 1964

3,134,396
BALL VALVE WITH ADJUSTABLE SEATS
Kurt B. Bredtschneider, Chicago, Ill., assignor to Crane Co., Chicago, Ill., a corporation of Illinois
Filed May 1, 1961, Ser. No. 113,587
1 Claim. (Cl. 137—315)

This invention relates to valves generally, and, more particularly, it is concerned with improvements in the type of valve known to those skilled in the art as a ball or spheroidal valve.

At the outset, in order to have a greater appreciation of the structural as well as the functional advantages which the valves of this invention contribute to a concededly well developed art, it should be realized that heretofore in valves of this general character the matter of convenient and positive adjustability of the valve seats with respect to the contact provided by the ball closure member has been a serious problem. This is, perhaps, better understood by realizing that the fluid sealing contact between the closure member and the oppositely disposed valve seats is necessarily a critical one and depends to a large degree on the extreme accuracy employed in the initial manufacture of the mating parts as well as the assembly by the manufacturer. Of course, the subsequent maintenance of pipelines in fairly clean condition is essential, because the interpositioning of foreign matter between the valve seat and closure member can readily result in minor leakage initially and subsequently in a greater degree of escape of line fluids leading to the destruction or scrapping of the valve eventually.

Therefore, it is one of the more important objects of this invention to provide a ball type of valve in which the seat rings therefor are not only accurately adjustable, but preferably employ a sealing means in combination therewith to result in improved closure efficiency in fluid sealing as well as in greater ease of operation.

A further important object is to provide for a valve construction in which the vertical or central axis of the rotating ball closure member is firmly established and the floating seat carriers have suitable fluid sealing means, such as O-rings and the like, thereby to provide for convenient, economical and more effective fluid sealing within the valve housing or body.

Another important object is to provide a valve construction in which the initial contact between the ball closure member and the valve seats are effected by floating seat carriers, in which the latter are adjustable axially or lengthwise through adjusting means which preferably penetrate the valve housing with O-ring seals and are therefore conveniently accessible from the exterior thereof as later made clear herein.

A still further important object is to provide for a ball valve construction in which alternatively relatively floating metal or composition rings are assembled for providing fluid sealing contact with the ball closure member and cooperate in retaining the valve seat rings adjustably in the desired position in relation to the ball closure member.

A further object is to provide for an adjustable mounting for axially positioning body seat rings in a ball valve in which the seat rings are resiliently maintained in place.

Another object is to provide for an improved ball valve construction in which a resilient and manually adjustable means for effecting fluid sealing by the seat rings may be accomplished without disassembling the valve or removing it from the pipe line on which it is installed.

Other objects and advantages will become more readily apparent upon proceeding with the following description read in light of the accompanying drawings, in which:

FIG. 1 is a view in fragmentary assembly and FIG. 2 is a transverse sectional view of the structure shown in FIG. 1 and with the ball closure member removed.

Referring now to FIG. 1, the upper half portion of a valve body or casing generally designated 1 is shown and is provided with the usual end flange attachment means 2 and 3, for the valve inlet and outlet respectively. The latter order may be changed to suit conditions for attachment to the usual pipe line by means of bolts (not shown), or other forms of connection may be used such as screw, weld, solder, or brazing as desired. The body passages 4 and 5 communicate respectively in the usual manner with the interior of the conduit to which the valve is attached, and the valve casing 1 is provided with a central valve chamber 6, the latter being of generally cylindrical configuration having its lower limits defined by a reduced chamber 7 and having its upper limits with in the casing as at 8 provided with the enlarged opening for receiving the cooperative mechanism for actuating the valve closure member as immediately hereinafter described.

It will be noted that the lowermost portions 7 of the central valve chamber 6 being reduced in its cylindrical configuration receives the lower trunnion (not shown) of the ported ball valve closure member which latter member is generally designated 11. The closure member ported at 12 is provided with the outer spheroidal surface 49 for effecting the fluid sealing contacts within the valve body as more clearly set forth hereinafter in greater detail. At its upper end portion, the closure member 11 is provided with an upper trunnion 13 journally mounted in the bonnet or cover which is generally designated 14. The bonnet is received and fits relatively closely within the opening in upper annular hub extension 15 of the said body, and as indicated, is mounted therewithin to provide a fluid tight seal as indicated by means of the sealing ring means 16. The bonnet is held against relative rotation by means of the pin 10 and preferably shoulders at the body inner annular projection 17. It is held firmly in position against axial ejectment arising from line fluid pressure by the retaining split ring member 18, the latter member being fitted within the groove 19 of the said casing hub 15. Above the journalling portion of the trunnion 13 and in axial alignment therewith, the actuating stem head generally designated 21 is mounted within an upper reduced portion of the said bonnet hub and is provided with a depending integral polygonal portion 22 engaging the similarly formed recess 23 on the end of the trunnion 13 of the rotable ball closure member 11.

At its upper end portion, the bonnet 14 is provided with an annular recess 24 for receiving the annular shoulder 25 of the stem head 21. The thrust bushing 26 is preferably interposed, as shown, at the upper limit of the chamber 24 to receive the outwardly directed thrust of the valve stem head under the influence normally exerted by fluid line pressure. Encompassing the reduced shaft portion 27 of the stem head 21, fluid sealing means at 28 are provided and at the upper end portion of the shaft 27 a square projection or other suitable polygonal means (not shown) is provided for engagement by the usual wrench or operating lever, the latter being suitably recessed to receive the said polygonal portion.

A significant feature of this invention lies in the unusual seating arrangement as previously referred to, existing between the ball closure member and the valve body by means of the interposed valve seats. Sealing rings 51 are preferably provided between the casing recessed portion 52 and the outer peripheral surface of the seat ring members as shown, thus to provide the fluid sealing function for the ring assembly. While the upper and lower trunnions may be mounted so as to bear directly within the annular surfaces in the body and in the bonnet it has been found desirable especially on severe service to use a suitable bearing material, as indicated at 53, to resist the transverse thrust exerted by line fluid pressure when the valve is in the closed position which takes place when the ball plug 11 is rotated ninety degrees from the position indicated.

In withdrawing the ball plug member 11 from the housing for inspection, replacement or repair, as hereinafter explained, the tapped portion 30 in the ball recess 23 may be used to engage a threaded draw-bolt for such purpose and conveying the pulled plug.

The instant invention allows for the valve seats 101 to be resiliently mounted within the valve casing for limited axial movement therewithin as hereinafter described in greater detail. The said seat rings in each case are provided with the radially extending flange portions consisting of spaced-apart annularly arranged projecting lugs 102 as more clearly shown in FIG. 2. The number, shape and arrangement of those lugs on the body seat rings 101 will vary in accordance with the size of valve and type of service for which the valve is recommended.

The said projecting lugs are recessed as at 103 and preferably such recess is of polygonal form to receive the elongated threaded attachment pin 105 which at its outer threaded shank portion 106 is enclosed by a hollow adjusting screw member or plug 104 in end abutting relation to the outer end surface of the threaded portion 106. The said plug is removable, protecting and keeping the threads 106 clean and prepared for the function which they serve, as hereinafter explained. As indicated, the plug 104 does not engage the threads 106 of said pin, but, instead, provides a clearance or chamber with a suitable space around the said threads of the pin 105, having on its exterior threads at 107 for effecting its attachment to the casing 1.

Each of the body seat rings 101 is provided with the concave spheroidal surface 108 and at substantially a median surface portion thereof is recessed to receive a preferably composition seat insert member 111 engaging the convex surface 49 on the closure member 11. The inner end portion of the pin 105 is threaded at 109 to receive the square or polygonal nut 112 pinned to the said threaded pin and in cooperation with the polygonal recess 103 serves to hold the pin 105 and nut 103 against rotation when making axial adjustments for the seat mounting or when it becomes necessary to remove the ball closure member 11. The inner end portion of the attachment pin 105 extends through an aperture 113 in the lug 102 and is provided with a spacer tubular member 114. Within the bored portion 116, the pin member 105 is provided with the integral collar 115 at substantially a median longitudinal portion thereof so that between the collar 115 and the member 114 a coiled spring 110 is suitably interposed to provide for the desired resiliency axially in the mounting of the seat rings 101, initially established by the threaded adjustment of the plug 104.

In a location outwardly of the collar 115 a suitable groove is provided within which recess the sealing O-ring 117 is received. It is held firmly in position by reason of its abutment against the inner end portion 118 of the threaded plug 104. The latter member has an inner end stop surface 121 to receive the end 106 of the pin 105 in abutting relation as illustrated as previously described. To provide for said desired withdrawal of the seat rings axially, this operation is done by simply removing the threaded plug 104 through the access openings 120 in the flanges 2 and 3, and then applying a conventional nut (not shown) and having its threads engage the threads 106 of the pin 105. The nut is drawn up on said threads until it shoulders on the casing. Continued rotation of the nut on the pin will thus draw the latter member axially outwardly with the nut 112 bearing against the base of the recess 103. When the nut has been tightened sufficiently, the rings 101 will be free of the closure member engagement and also clear to permit drawing said closure member outwardly past the inner end limit of said seat rings. Actually, the manner in which the rotation of the threaded plug 104 and its installation or removal is accomplished is preferably by means of a socket wrench suitably applied endwise through the access openings 120 or through end flange bolt hole.

In order that the body seat rings 101 in the course of their use do not allow for the accumulation of any foreign matter in the pipe lines at the outer ends of the seat rings and the chamber defined by the annular wall surface 52, it has been found desirable to provide the reduced annular extension 100 which is integral with the seat rings 101 with a sharp annular edge as shown. The said extension also functions to guide the body seat ring during the course of adjusting the axial positioning of the seat rings when removing the closure member as above described through the bonnet opening for inspection or replacement.

It will be clear that a compact and effective means has thus been provided whereby the body seat rings can easily be adjusted axially. It will also be understood that normally the coil spring 110 will provide the desired thrust inwardly in positioning the seat rings 101 against the closure member 11.

In all other respects, the construction of the several modified forms immediately hereinabove referred to follow generally the description of the earlier figures, and, hence, it is deemed unnecessary to dwell in further detail on the further description of the device.

While only a single embodiment has been shown and described, it should be obvious that this has been only for purpose of illustration of the scope of the invention and not of limitation and that many other forms may be used falling within the terms of the appended claim.

I claim:

A ball valve construction with a substantially fixed ball axis and axially floating valve seats therefor, the combination of a valve body having inlet and outlet ports in substantial axial alignment and with a valve chamber therebetween in communication with said ports, oppositely disposed resiliently mounted valve annular seats predeterminately non-rotatable in the ports, the said seats being movable axially and having radially extending spaced-apart lugs projecting within said valve chamber, a rotatable ported ball closure member journaled withinin said valve chamber, the said ball closure member having oppositely disposed axially aligned trunnions rotatable in a vertical plane on the fixed ball axis, a cover for the valve chamber having means to receive one of said trunnions, the said body having means to receive the other of said trunnions to provide for positioning said ball closure member on said fixed ball axis, the said seats having means thereon non-rotatably engaging said body for positively withdrawing said seats upon predetermined engagement of said seat lugs by said non-rotatable means for moving said seats axially outward of the closure member distances sufficient for said seats to stand clear of the adjacent ends of the ported portions of said closure member in the valve open position upon said predetermined engagement and movement of said seat means, said seat means resiliently adjusting said seats against the said ball closure member and to enable removal of the said closure member predeterminately past said seats upon said axial outward movement of the latter members in a direction transverse to and away from the fixed axis of said closure member, the said seat withdrawing means being accessible exteriorly of said valve body, the said seat withdrawing means comprising a plurality of spaced apart threaded pins and hollow plug means therefor, each of the said seat lugs being in alignment with each of the said pins and plug means, the said threaded pins having an outer portion telescoped within said hollow plug means in end abutting relation thereto whereby upon predetermined rotation of said plug means the said threaded pins are moved axially inward against said seats.

References Cited in the file of this patent
UNITED STATES PATENTS

| | | |
|---|---|---|
| 712,350 | Williamson | Oct. 28, 1902 |
| 1,727,677 | Siebert | Sept. 10, 1929 |
| 1,738,450 | Ryan | Dec. 3, 1929 |
| 2,011,082 | Robinson | Aug. 13, 1935 |
| 2,558,247 | Hamer | June 26, 1951 |
| 2,639,883 | Smith | May 26, 1953 |
| 2,709,455 | Greenwood | May 31, 1955 |
| 2,883,146 | Knox | Apr. 21, 1959 |
| 3,037,738 | Jackson | June 5, 1962 |

FOREIGN PATENTS

| | | |
|---|---|---|
| NR195,704 | Austria | Feb. 25, 1958 |
| 1,220,081 | France | Jan. 4, 1960 |
| 1,102,510 | Germany | Mar. 16, 1961 |